(12) United States Patent
Reddy et al.

(10) Patent No.: US 11,427,484 B1
(45) Date of Patent: Aug. 30, 2022

(54) SALT WATER CHLORINE GENERATOR HAVING AN INTEGRAL MULTIFUNCTIONAL FLOW SENSOR

(71) Applicants: Rakesh Reddy, Boca Raton, FL (US); Kevin Doyle, Delray Beach, FL (US); William Kent, Fort Lauderdale, FL (US)

(72) Inventors: Rakesh Reddy, Boca Raton, FL (US); Kevin Doyle, Delray Beach, FL (US); William Kent, Fort Lauderdale, FL (US)

(73) Assignee: AQUACAL AUTOPILOT, INC., St Petersburg, FL (US)

( * ) Notice: Subject to any disclaimer, the term of this patent is extended or adjusted under 35 U.S.C. 154(b) by 37 days.

(21) Appl. No.: 17/067,678

(22) Filed: Oct. 10, 2020

Related U.S. Application Data

(63) Continuation-in-part of application No. 15/998,471, filed on Aug. 15, 2018, now Pat. No. 10,801,225.
(Continued)

(51) Int. Cl.
*C02F 1/46* (2006.01)
*E04H 1/12* (2006.01)
(Continued)

(52) U.S. Cl.
CPC ............ *C02F 1/4674* (2013.01); *C02F 1/008* (2013.01); *C02F 1/46104* (2013.01); *E04H 4/1281* (2013.01); *C02F 2103/42* (2013.01)

(58) Field of Classification Search
CPC ... E04H 4/1245; E04H 4/1209; E04H 4/1281; E04H 4/129; C02F 1/4674; C02F 1/46104; C02F 2201/46145; C02F 2303/04; C02F 2201/46155; C02F 2201/46125; C02F 2103/42; C02F 2209/008; C02F 2201/46105; C02F 2201/4611;
(Continued)

(56) References Cited

U.S. PATENT DOCUMENTS

| | | | | |
|---|---|---|---|---|
| 3,274,094 A | * | 9/1966 | Klein | C02F 1/4674 210/756 |
| 4,328,084 A | * | 5/1982 | Shindell | C02F 1/46104 204/237 |

(Continued)

*Primary Examiner* — Joseph W Drodge
(74) *Attorney, Agent, or Firm* — Dale P. DiMaggio, Esq.; Malin Haley DiMaggio & Bowen, P.A.

(57) ABSTRACT

A salt water chlorinator assembly along a closed loop water circuit incorporates a chlorinator cell subassembly and a flow switch subassembly into respective fluidly connected chlorinator assembly housing interior portions. The chlorinator cell subassembly includes an electrolysis cell controlled by a chlorinator printed circuit board. The flow switch subassembly includes a flow sensor mounted upon a printed circuit board assembly (PCBA). A flow switch cable selectively attaches to a PCBA connector. Water flow rate data generated by the flow switch sensor, communicated via an external controller to a smart circulation pump, is used to enable automatic adjustment of the pump speed based upon the flow rate data. The external controller may further alert an end user of undesirable flow rate deviations due to a condition (e.g. a clogged pump/skimmer basket and/or dirty filter) along the closed loop circuit requiring attention.

12 Claims, 3 Drawing Sheets

Related U.S. Application Data

(60) Provisional application No. 62/545,992, filed on Aug. 15, 2017.

(51) Int. Cl.
    *C02F 1/467*    (2006.01)
    *E04H 4/12*    (2006.01)
    *C02F 1/461*    (2006.01)
    *C02F 1/00*    (2006.01)
    *C02F 103/42*    (2006.01)

(58) Field of Classification Search
    CPC .............. C02F 2201/4616; C02F 1/008; C02F 2009/005; C02F 2009/40; F04D 13/06; F04D 1/00; F04D 29/708; F04D 29/58; F04B 17/00; F04B 17/03; F04B 17/04; F04B 19/00; F04B 19/04; F04B 23/00; F04B 23/04; F04B 23/08
See application file for complete search history.

(56) References Cited

U.S. PATENT DOCUMENTS

| | | | |
|---|---|---|---|
| 5,422,014 A * | 6/1995 | Allen | C02F 1/008<br>210/743 |
| 6,096,202 A * | 8/2000 | Fulmer | C02F 1/46104<br>210/136 |
| 7,707,665 B1 * | 5/2010 | Hong | E03B 1/048<br>4/597 |
| 10,801,225 B1 * | 10/2020 | Reddy | C02F 1/46104 |
| 2005/0137118 A1 * | 6/2005 | Silveri | C02F 1/008<br>510/514 |
| 2006/0054568 A1 * | 3/2006 | Jones | C02F 1/36<br>210/764 |
| 2006/0097878 A1 * | 5/2006 | Von Broembsen | C02F 1/4674<br>340/572.8 |
| 2006/0249400 A1 * | 11/2006 | Bremauer | C02F 1/4674<br>205/743 |
| 2009/0038696 A1 * | 2/2009 | Levin | F04B 49/065<br>417/1 |
| 2009/0167540 A1 * | 7/2009 | Struyk | G01P 13/002<br>340/610 |
| 2009/0211919 A1 * | 8/2009 | Hegel | C02F 1/42<br>205/633 |
| 2011/0253528 A1 * | 10/2011 | Hui | C02F 1/4674<br>204/269 |
| 2012/0234673 A1 * | 9/2012 | Davidson | C02F 1/4602<br>204/227 |
| 2013/0105372 A1 * | 5/2013 | Chen | C25B 1/245<br>210/97 |
| 2013/0334113 A1 * | 12/2013 | Erlich | E04H 4/1263<br>210/167.1 |
| 2014/0303757 A1 * | 10/2014 | Pruchniewski | E04H 4/14<br>700/90 |
| 2014/0303781 A1 * | 10/2014 | Potucek | H04L 41/082<br>700/275 |
| 2016/0214041 A1 * | 7/2016 | Miller | B01D 35/04 |
| 2016/0340205 A1 * | 11/2016 | Murdock | A61H 33/005 |
| 2017/0209338 A1 * | 7/2017 | Potucek | A61H 33/005 |
| 2018/0273404 A1 * | 9/2018 | Denkewicz, Jr. | C02F 1/4674 |

\* cited by examiner

SALT WATER CHLORINE GENERATOR HAVING AN INTEGRAL MULTIFUNCTIONAL FLOW SENSOR

RELATED APPLICATIONS

This application is a continuation-in-part of U.S. non-provisional patent application Ser. No. 15/998,471, having a filing date of Aug. 15, 2018, now U.S. Pat. No. 10,801,225, which in turn claims priority to U.S. provisional patent application No. 62/545,992, having a filing date of Aug. 15, 2017. The entire disclosures of both related applications are incorporated-by-reference herein.

FIELD OF THE INVENTION

The present invention relates generally to the maintenance of swimming pools. More particularly, the invention pertains to a swimming pool salt water chlorine generator, or chlorinator, incorporating an integral multifunctional flow sensor communicative with a swimming pool system smart water pump, via an external controller, to dynamically alter the flow rate of pool water through a closed loop pool circulation system responsive to flow sensor data.

BACKGROUND OF THE INVENTION

Conventional swimming pool water maintenance systems, sometimes referred to as pool circulation systems, take water from the pool, filter it, (optionally) heat and purify it, and subsequently return the water back to the pool. Such systems generally incorporate a series of devices fluidly interconnected with one another and with a corresponding body of pool water, via a closed loop water conduit system, through which pool water is cycled, or recirculated.

The heart of any pool maintenance, or water treatment, system is the water recirculation pump, which generates and maintains the hydraulic flow and pressure needed to circulate water through a pool or spa's plumbing system and related devices/equipment. The pool water recirculation pump primarily drives the circulation of water drawn from the main body of pool water, through pool outlets, such as the main drain and skimmers, into the water recirculation pump, for fluid communication through a series of pool water maintenance devices and equipment serially interconnected via conduit sections through which the circulating water travels before being reintroduced back into the main body of pool water through pool water returns. The interconnected devices and equipment may include, for example, a pool filter, a pool water-heating pump, or heat pump, and a water purification device, such as a chlorinator. The water circulation system components clarify, chemically balance, disinfect, and (optionally) heat the swimming pool water. Typically, circulation systems are configured to maintain a circulation flow rate corresponding to a desired turnover period, or turnover rate, in the pool. The turnover rate of a swimming pool is the amount of time it takes for the pumping and filtration systems to cycle an entire volume of pool water one time.

Typically, the recirculation pump is set to a speed resulting in a water pumping rate corresponding to a desired turnover rate. Generally, to determine a minimum desired pumping/flow rate adequate to move the entire contents of a swimming pool through the filter, the total volume of pool water is divided by the desired turnover rate. However, this calculation is theoretical and does not take into account inherent conditions along the closed loop circulation system, which result in variations in water flow rate at particular locations along the closed loop, and a resulting variation in the actual flow rate of water being returned to the pool, spa, water features, etc. For example, pool pump/skimmer baskets and pool filters, by design, get clogged and dirty, respectively, over time; consequently, restricting water flow through the circulation system.

Conventional controller-based automation systems enable wired and wireless control of pool pumps (e.g. to control water flow to water features or to turn a pump on and off), pool/spa heaters (e.g. to remotely turn a heater on and off, and to set a desired water heating temperature), water features (e.g., to remotely turn laminar jets, fountains and waterfalls on and off), chlorinators, filters, valves and other mechanical pool water circulation components. Although such control systems are typically configured to be programmed by a user, such as a homeowner, from a wired control panel or wirelessly via a control panel dongle, to control the various systems and system components coupled thereto, it may be desirable to provide automatic adjustment of the control implemented by the controller for one or more of the coupled systems and/or components.

Some automation systems are known for the residential pool market. For instance, flow sensing switches are known which can by plumbed into a circulation system and are designed to automatically toggle circulation system components—such as pool pumps, heaters, sanitizers, water features and the like—between 'ON' and 'OFF' states. For instance, it is known to incorporate a water turbidity sensor communicative with a controller configured to adjust operation of a water pump based on a turbidity signal from the water turbidity sensor, or an air humidity sensor communicative with a controller configured to adjust chemical dispensing based on a humidity signal from the humidity sensor.

Furthermore, pumping systems are known which include a controller adapted to determine a current pump motor speed and current flow rate, generate a difference value between the current flow rate and a reference flow rate (such as a desired constant flow rate), and drive the pump motor at an adjusted motor speed based on the difference value until reaching a steady state flow condition. However, these systems are costly to install and maintain. Moreover, they require a disruption of existing plumbing. Existing systems are further limited in functionality. For instance, they do not provide any means for communication a flow impeding condition to a user, such as a homeowner, to put the homeowner on notice that, for example, a skimmer or pump basket is clogged and requires cleaning, or that a filter is dirty and requires cleaning or replacement.

Accordingly, it would be highly desirable to provide a flow control subassembly capable of being inexpensively and efficiently installed as part of a new pool system or, alternatively, within an existing circulation system, such that installation and post-installation maintenance can be accomplished inexpensively and efficiently without requiring a significant disruption of existing plumbing.

It would be even more desirable to provide such a flow control subassembly directly integrated into a commonly-used conventional pool maintenance system component, such that flow control components of the subassembly are readily accessible to be fixed or replaced as necessary.

A preferred flow control subassembly would incorporate means for accurately detecting deviations from a desired flow rate, and subsequently communicating flow rate data to a smart pool pump, via an external controller, signaling the smart pool pump to automatically adjust the pump motor speed to return to a desired flow rate, for example, based upon a desired pool water turnover rate, a desired water feature flow rate and the like. It would be further beneficial for such a flow control subassembly to communicate a circulation system condition (e.g. a clogged basket and/or dirty filter) indicated by the detected flow rate deviation to a remote user via the external controller. In this manner, the user would be immediately aware of any such circulation system conditions requiring attention.

It would be further desirable to provide a pool maintenance system incorporating means for communicating a message to a homeowner when a restriction is detected in the system (e.g. due to a dirty/clogged basket or filter) causing a decrease in the circulation flow rate. In this manner, a homeowner would be immediately notified when, for example, a clogged basket and/or dirty filter requires attention. Thus, the system would both adjust the circulation flow rate, via adjustment of the pump speed, and alert the homeowner that the basket(s) and/or filter(s) require cleaning.

SUMMARY OF THE INVENTION

The present invention provides for such a pool maintenance system, wherein a swimming pool salt water chlorine generator assembly incorporates a flow switch subassembly, including a flow switch sensor, capable of detecting and quantifying pool system flow rate deviations (i.e., from a desired flow rate), and subsequently communicating associated flow rate deviation data to a smart pool pump, via an external controller, to signal the smart pool pump to adjust (i.e. either increase or decrease) the pump motor speed to a setting adequate to return the flow back to the desired flow rate. Among other features, the chlorine generator assembly communicates with an external controller to promptly alert a homeowner of a flow-impeding condition requiring attention.

In accordance with one aspect of the present invention, a chlorinator cell assembly is configured to be plumbed into a pool's closed loop circulation system, wherein the circulation system includes:

(a) a water recirculation pump having a variable speed pump motor for driving the flow of water through the circulation system;

(b) an electrolytic cell contained within a chlorinator cell assembly housing;

(c) a flow switch subassembly contained within the chlorinator cell assembly housing and communicative with the electrolytic cell, wherein the electrolytic cell and flow switch subassembly are located between a cell housing water flow inlet and a cell housing water flow outlet; and (d) an external system controller in communication with both the water recirculation pump and the flow switch subassembly.

In some embodiments, the flow switch subassembly may include means for sensing, determining, or the like one or more parameters or performance values indicative of an operation being performed upon water circulating through the closed loop circulation system.

In some embodiments, the chlorinator cell assembly may include means for sensing, determining or the like one or more parameters or performance values indicative of the movement of water, or flow, through the closed loop circulation system.

In some embodiments, the sensing means may include a flow switch subassembly integrated within a chlorinator cell assembly housing and connected to an exterior flow switch sensor cable extending into the chlorinator cell assembly housing.

In some embodiments, the flow switch subassembly may include a flow sensor printed circuit board assembly (PCBA) in communication with the flow switch sensor cable.

In some embodiments, the PCBA may be in communication with parallel electrode plates of an electrolytic cell contained within the chlorinator assembly housing.

In some embodiments, the flow sensor may be a Hall-effect type sensor mounted upon the flow sensor PCBA.

In some embodiments, the flow switch subassembly may be constructed and configured such that the flow sensor is precluded from failing while in an "ON" position, or state.

In some embodiments, the flow switch subassembly of the chlorinator assembly may be plumbed into the pool's closed loop circulation system as the last of a series of pool maintenance system components (e.g. after water circulation system pump and filtration components) and just prior to one or more pool water features to enable accurate measurement of water flow being received by the water features.

In some embodiments, the external controller may communicate with the flow switch assembly to receive system flow-related information and data.

In some embodiments, the external controller may communicate with the pump motor to adjust pump motor speed based upon the received system flow-related data.

In some embodiments, the external controller may communicate an alert to an external device, such as a homeowner's portable smart device, when system flow-related data indicates a particular condition requiring attention (e.g. a clogged pool pump basket or a dirty filter) within the closed loop circulation system.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 1 through FIG. 3 are referenced below.

Like reference numerals refer to like parts throughout the several views of the drawings.

DESCRIPTION OF EXAMPLE EMBODIMENTS

The following detailed description is merely exemplary in nature and is not intended to limit the described embodiments or the application and uses of the described embodiments. Certain terminology is used herein for convenience only and is not to be taken as a limitation on the present invention. As used herein, the terms "exemplary" or "illustrative" mean "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
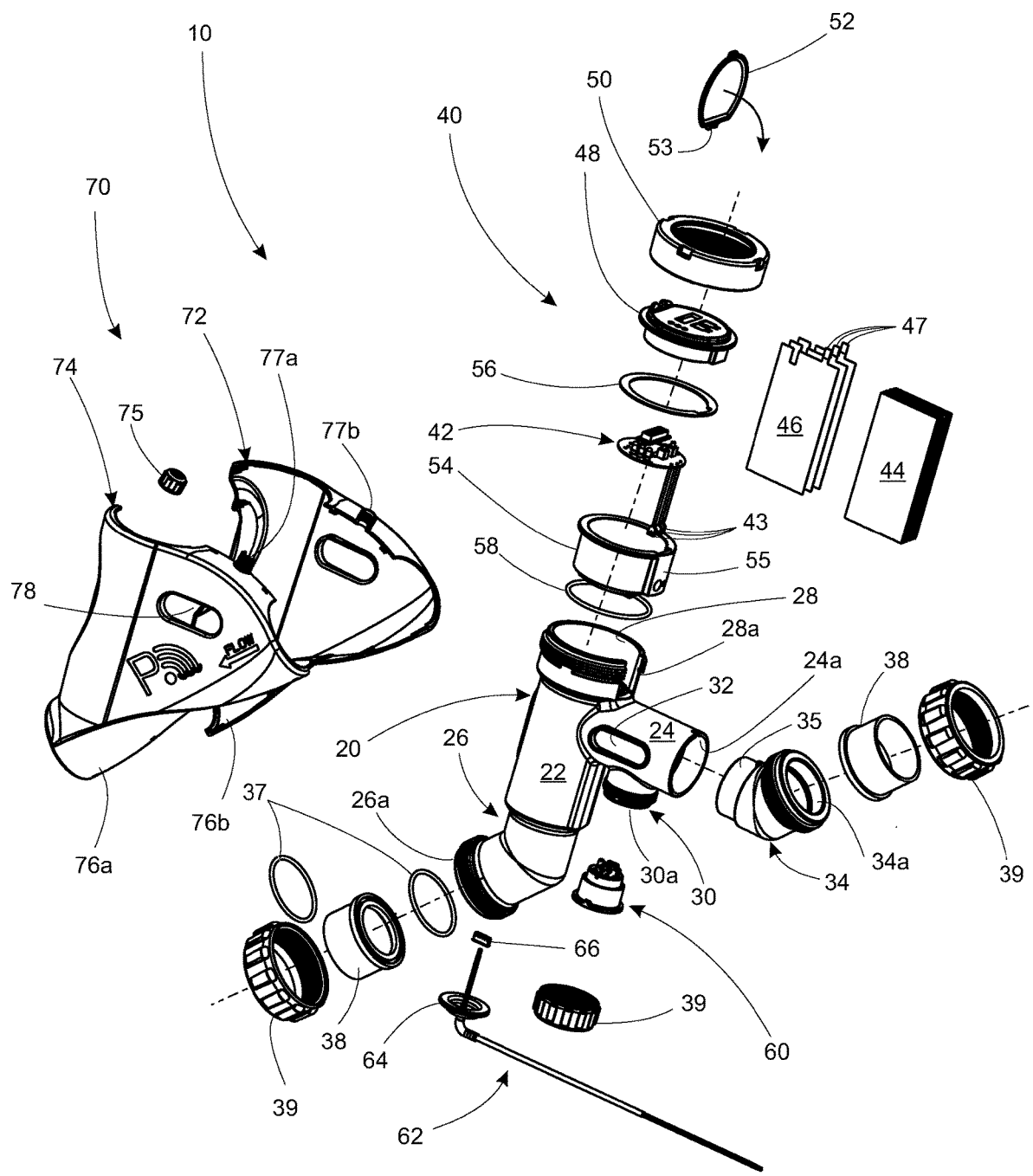
FIG. 1 is an upper-right-front exploded perspective view of a salt water chlorine generator assembly, in accordance with the present invention.

For purposes of description herein, the terms "upper," "lower," "left," "right," "rear," "front," "vertical," "horizontal," and derivatives thereof, shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Initially, it should be noted that the present invention is described with respect to a swimming pool maintenance system merely for convenience. In fact, the present invention may be employed for use with other bodies of water (e.g. spas and whirlpool baths), including features and accessories associated therewith, such as water jets, waterfalls, fountains, pool filtration equipment, chemical treatment equipment, pool vacuums, spillways and the like.

In accordance with a general aspect of the present invention, a salt water chlorine generator assembly, or chlorinator assembly, incorporates means for sensing, determining, or the like one or more parameters or performance values indicative of an operation performed upon water circulating through the closed loop circulation system. Within one specific example, the chlorinator assembly includes means for sensing, determining or the like one or more parameters or performance values indicative of the movement of water, or flow, within the closed loop circulation system. This is accomplished through the integration of a flow switch subassembly within the chlorinator cell assembly, which communicates with one or more in-line devices along the closed loop system via an external controller.

One of the most basic pool water maintenance/treatment system sub-components is the water purifier, or water sanitizer, which, in a majority of systems consists of a chlorination system, or salt water chlorine generator. Salt water chlorination is a process that uses dissolved salt as a store for the chlorination system. A salt water chlorine generator (alternatively referred to as a "salt cell," a "salt generator," a "chlorine generator," a "chlorinator," and the like) employs electrolysis in the presence of dissolved salts to produce hypochlorous acid and sodium hypochlorite, which are the sanitizing agents already commonly used in swimming pools. The chlorinator cell typically consists of parallel titanium plates coated with ruthenium and sometimes iridium. Older models may incorporate perforated, or mesh, plates in lieu of solid plates. Electrolysis naturally attracts calcium and other minerals to the plates. The benefits of such salt systems in pools include convenience and the continual delivery of pure chlorine-based sanitizer. The reduction of irritating chloramines versus traditional chlorinating methods, and the "softening" effect of electrolysis reducing dissolved mineral in water, are also perceived as benefits.

The novel chlorinator assembly of the present invention integrates a flow switch subassembly with a chlorine generator.

Figure 2:
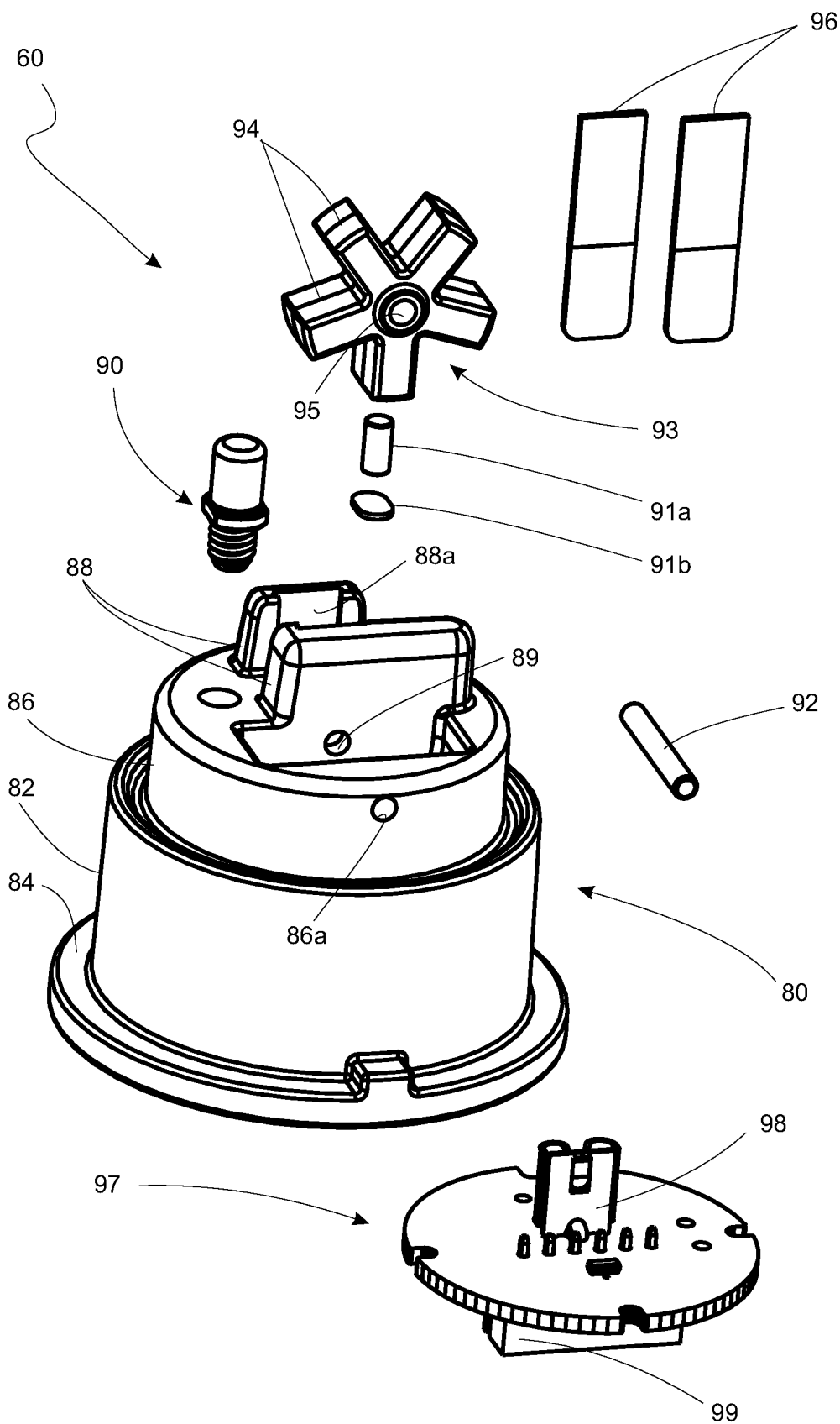
FIG. 2 is an upper-right-front exploded perspective view of a flow switch subassembly of the salt water chlorine generator assembly, in accordance with the present invention.
Figure 3:
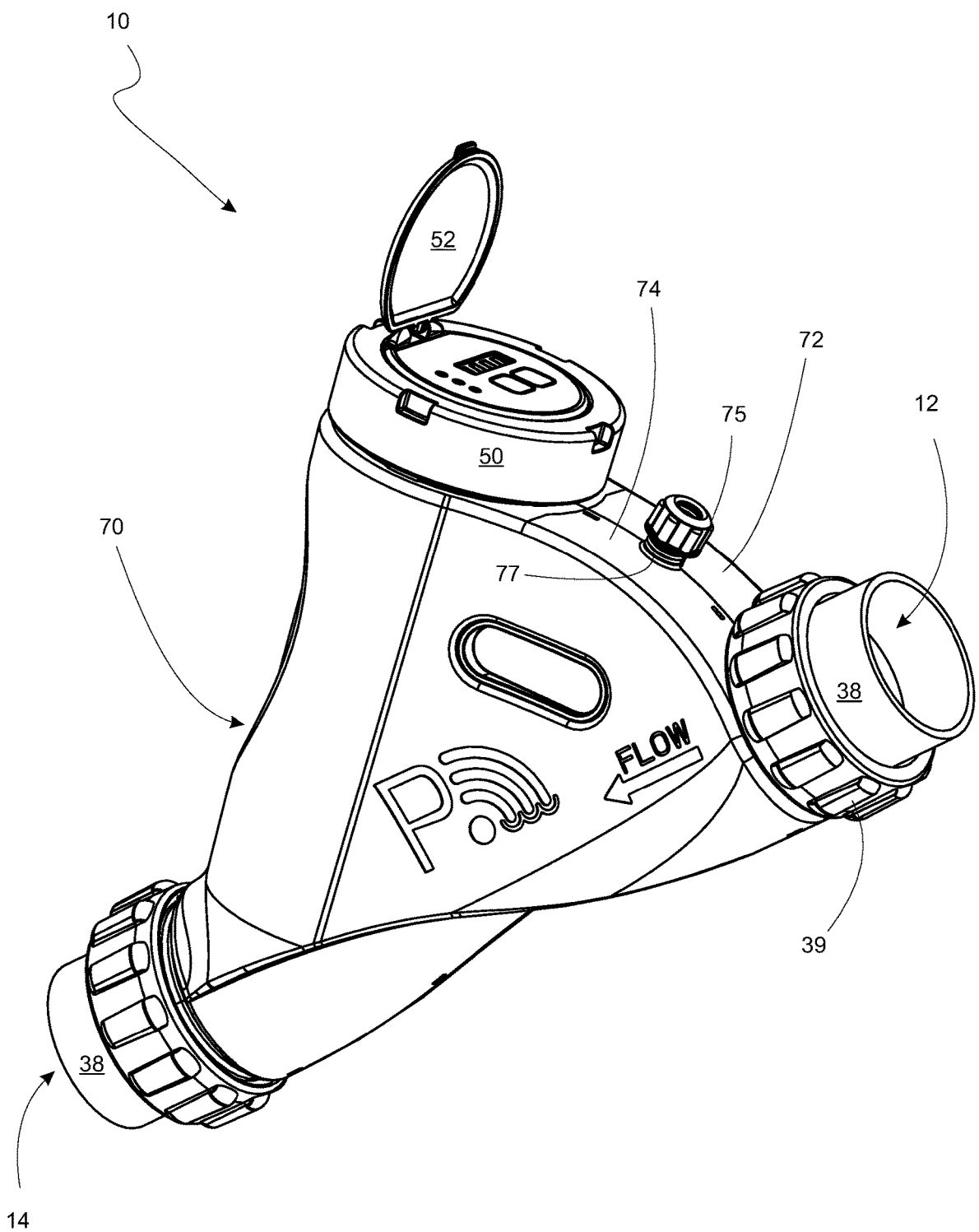
FIG. 3 is an upper-right-front perspective view of the salt water chlorine generator introduced in FIG. 1 shown in a fully assembled state.

Referring briefly to FIG. 3, the salt water chlorinator assembly 10, in a fully assembled state, defines a water flow inlet 12 at one end and a water flow outlet 14 at an opposite end. Referring now to FIGS. 1-3, the chlorinator assembly 10 generally includes a chlorinator cell housing 20, a chlorinator cell subassembly 40, and a flow switch subassembly 60. As described in more detail herein, the chlorinator cell subassembly 40 and flow switch subassembly 60 are contained within the chlorinator cell housing 20. Once fully assembled, the chlorinator cell housing is enclosed by an outer shell 70.

Chlorinator cell housing 20 defines an electrolytic cell housing portion 22 in fluid communication with a flow switch assembly housing portion 30 via a water flow ingress conduit section 24. Flow switch subassembly 60 is received through exteriorly-threaded opening 30a and sealingly seated within housing portion 30 via coupling nut 39 such that the flow switch subassembly extends slightly into water flow ingress conduit section 24 to enable accurate measurement of the flow rate of water moving therethrough. Water flow ingress conduit section 24 may include one or more windows 32 through which the flow of water may be viewed. The water flow ingress conduit section 24 may be connected to a closed loop water circulation conduit via conventional mechanical conduit fittings, such as an elbow coupling 34, a connector 38, and coupling nut 39. The reduced diameter end 35 of the elbow coupling 34 may be coupled to inlet opening 24a of conduit section 24 using conventional means, such as chemical adhesive. In similar fashion, conventional mechanical conduit fittings may be employed to connect water flow egress conduit section 26.

As best shown in FIG. 1, chlorinator cell subassembly 40 preferably includes a printed circuit board assembly (PCBA) 42, an electrolytic cell 44 having a plurality of parallel electrode plates 46, and a plurality of electrical connector members 43 interconnecting the parallel electrode plates with PCBA 42 via respective electrode plate coupling features 47. More specifically, the printed circuit board assembly 42 of chlorinator subassembly 40 is contained within a chassis 54, such that downwardly-depending electrical connector members 43 extend through a bottom of the chassis and into electrolytic cell housing portion 22 containing electrolytic cell 44 and corresponding parallel electrode plates 46. For the purposes of maintaining proper alignment and preventing undesirable rotation, the chassis 54 may include a boss 55 slidably engageable with a slot 28a in a chassis receiving upper portion of the electrolytic cell housing portion 22. An O-ring 58 may be used to provide a seal between the inserted chassis 54 and the electrolytic cell housing portion 22. A chlorinator cell subassembly lid 48 protected externally by a protective cover 52 attached to an upper surface of the chlorinator cell subassembly lid 48 by a hinge 53. Preferably, a sealing gasket 56 is interposed between an upper flange of the lid and an upper flange of the chassis 54, and an internally-threaded cell top nut 50 attached to an externally-threaded chassis-receiving upper end portion of chlorinator cell housing 20 to secure the chlorinator subassembly 40 within the chassis—except for electrical connector members 43 extending through the bottom of the chassis.

Referring now primarily to FIG. 2, a flow switch subassembly 60 is shown in accordance with a representative implementation of the present invention. The flow switch subassembly is employed to determine whether there is adequate water flow through the salt water generator assembly housing 20. The flow switch assembly 60 includes a flow switch assembly housing 80 having a lower housing portion 82 having a lower flange 84 and transitioning to a reduced-diameter upper housing portion 86. The upper housing portion 86 is sized and shaped for snugly seating a printed circuit board assembly (PCBA) 97 of flow switch subassembly 60 therein. Flow switch assembly PCBA 97 may include a flow sensor 98 mounted on an upper surface, and a flow switch cable connector on an opposite lower surface. A flow switch sensor cable 62 is provided having a flow switch cable connector 66 configured for selective attachment to connector 99 mounted to flow switch subassembly printed circuit board assembly 97. A conventional sealing gasket 64 and coupling nut 39 may be used to secure flow switch subassembly 60, along with a short length of flow switch sensor cable adjacent to flow switch cable connector 66, within flow switch assembly housing portion 30.

In a preferred implementation of the present invention, flow sensor 98 is a Hall-effect sensor. A Hall-effect sensor is a semiconductor device (i.e. integrated circuit). An electric current must be flowing into the device in order to carry out its function. With current flowing, the Hall-effect sensor will interact with the presence of a magnetic field producing a voltage. The voltage level is proportional to the relative strength of the magnetic field. In other words, the output signal from the sensor is the function of magnetic field density around the device. When the magnetic flux density around the sensor exceeds a certain pre-set threshold, the sensor detects it and generates an output voltage commonly referred to as the Hall Voltage (VH).

The Hall-effect sensor 98 may be employed in conjunction with a rotary type flow meter, such as a paddlewheel flow meter, which uses the rotation of an impeller to measure flow. In accordance with a preferred implementation, a paddlewheel 93 is provided having paddlewheel blades 94 extending radially-outward from a central hub aperture 95. Furthermore, each paddlewheel blade 94 has a magnet 91a, and corresponding magnet plug 91b, integrated therein. The paddlewheel 93 is rotatably mounted about a paddlewheel axle 92 extending through axially-aligned apertures 89 in spaced-apart tabs 88 extending upwards through a top side of upper portion 86 of flow switch PCBA housing 80. Preferably, opposite ends of the paddlewheel axle 92 further extend through corresponding axially-aligned apertures 86a through the sidewall of upper portion 86.

Preferably, the paddlewheel axle 92 is positioned and oriented such that approximately one-half of each paddle blade 94 protrudes into the water flow stream. Fluid flowing through chlorinator cell housing water flow ingress conduit 24 causes the paddlewheel to spin. As the magnets that are embedded in the paddle spin past the sensor 98, electrical pulses are produced that are proportional to the rate of flow. Paddlewheel-type flow sensor manufacturers publish the number of output pulses produced, per volume of flow, for each specific "pipe fitting." This number is called the K-factor.

In operation, water flow pushes the rotor (e.g., paddlewheel 93) and the rotation is detected by the Hall-effect sensor. Hall Effect type sensors output a digital, current sinking, DC square wave that is proportional to the flow rate. These pulses are then counted by the electronic flow controller. Changes in the output flow rate will not affect the sensor count. Circuitry that is sensitive to magnetic fields is triggered by the spinning paddlewheel. This circuitry requires external input voltage to operate. Flow displays and controllers are used to receive the signal from the paddlewheel sensor, convert the signal into an actual flow rate or flow total value, and display the values. The processed signal can then be used to, for example, open and close valves, start and stop pumps, indicate high or low flow rate alarms in the system or transmit pulse signals to external equipment.

In stark contrast to conventional flow switches, which are highly susceptible to getting stuck in an ON position due to debris in the water flow, a rotating wheel cannot get stuck because the circuit must see a pulse train. Furthermore, the circuit design may incorporate means for checking the duty cycle to ensure that the pulse train is coming from flowing water (i.e. from the spinning paddlewheel 93), as opposed to coming from vibrations.

Referring particularly to FIG. 2, a temperature probe, shown generally by reference character 90, has a threaded lower portion that extends down into the upper portion 86 of flow switch PCBA housing 80. Furthermore, a pair of salt probes may be slidably inserted into slots 88a formed on the opposing surfaces of tabs 88. In this manner, the salt probes extend upwardly on opposite sides of the assembled paddlewheel 93 and directly in the path of the flowing water.

In a fully-assembled state, an outer shell 70 surrounds the assembled chlorinator cell housing 20, thereby obscuring the chlorinator cell housing from view and providing some protection. The outer shell 70 may have a rear outer shell portion 72 and a front outer shell portion 74, secured to one another via mechanical snap fit features, mechanical fasteners and the like. When assembled, a cylindrical shell flow outlet portion is formed by front outer shell portion 76a and rear outer shell portion 76b. In similar fashion, a wire nut receiving threaded aperture is formed by front outer shell portion 77a and rear outer shell portion 77b.

In contrast to systems that incorporate a separate flow switch, the integration of a flow switch with a chlorinator enables many new functions. In accordance with the present invention, the flow meter measures its own flow and keeps track of pool water turnover in order to control the pump to, for example, turn off the pump to stop water flow through the chlorinator assembly after a predefined number of turnovers. In operation, the chlorinator assembly of the present invention is adapted to communicate, via an external controller (not shown), with individual components, equipment, accessories, water features and the like, in order to automatically effect a change in pool water flow rate responsive to a particular condition associated therewith. For instance, if it is determined that the chlorinator cell subassembly 40 is not chlorinating at a desired rate, the system automatically determines a modified flow rate and adjusts the circulation pump motor speed. Flow rate may also be automatically adjusted responsive to a deviation from a desired flow rate (e.g. due to a clogged skimmer basket, a clogged pump basket, or a dirty filter impeding water flow), a deviation from a desired water salinity level, a deviation from a desired water temperature, and/or a deviation in a desired flow rate to one or more water features.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A salt water chlorine generator assembly integrated into a closed loop water circulation system, the salt water chlorine generator assembly comprising:
   a chlorinator cell housing defining a chlorinator cell housing interior space in fluid communication with a chlorinator cell housing water flow inlet and an opposite chlorinator cell housing water flow outlet, the chlorinator cell housing interior space defining an electrolytic cell compartment in fluid communication with a flow switch subassembly compartment;
   an electrolytic cell of a chlorinator cell subassembly contained within said electrolytic cell compartment;
   a flow switch subassembly contained within said flow switch subassembly compartment;
   said flow switch subassembly further comprising a flow switch subassembly housing; and
   a flow switch sensor printed circuit board assembly (PCBA) having a flow switch sensor mounted thereon, the flow switch sensor PCBA contained within an upper interior space of the flow switch subassembly housing.

2. The salt water chlorine generator assembly as recited in claim 1 wherein the flow switch sensor further comprises a Hall-effect sensor.

3. The salt water chlorine generator assembly as recited in claim 2, wherein the flow switch subassembly further comprises:
   a magnetic paddlewheel rotatably coupled to the flow switch subassembly housing via a paddlewheel axle extending through a paddlewheel hub aperture and supported at opposite ends by the flow switch subassembly housing, wherein radially extending magnetic paddlewheel blades extend into the upper interior space of the flow switch subassembly housing for magnetic communication with the Hall-effect sensor.

4. The salt water chlorine generator assembly recited in claim 3, further comprising a pair of salt measurement probes coupled to the flow switch housing and extending adjacent to corresponding opposite sides of the magnetic paddlewheel.

5. The salt water chlorine generator assembly recited in claim 1, further comprising a flow switch cable electrically connected to the flow switch sensor PCBA.

6. The salt water chlorine generator assembly recited in claim 1, wherein the chlorinator cell subassembly further comprises a plurality of spaced-apart parallel electrode plates electrically connected to a printed circuit board assembly (PCBA) of said chlorinator cell subassembly.

7. The salt water chlorine generator assembly recited in claim 6, further comprising a chassis housing the chlorinator cell subassembly PCBA.

8. The salt water chlorine generator assembly recited in claim 7, wherein the chlorinator cell subassembly PCBA further comprises a plurality of electrical connectors extending through the chassis housing, wherein a first end of each electrical connector is coupled to the chlorinator cell PCBA and an opposite second end of each electrical connector is coupled to a respective one of the parallel electrode plates of the chlorinator cell subassembly.

9. The salt water chlorine generator assembly recited in claim 1, wherein the flow sensor PCBA is in communication, via an external controller, with one or more pool maintenance devices along said closed loop water circulation system.

10. The salt water chlorine generator assembly recited in claim 9, wherein said one or more pool maintenance devices further comprises at least one of:
   a smart water circulation pump;
   water filtration equipment;
   a water heater;
   a pool vacuum accessory; and
   a water feature.

11. The salt water chlorine generator assembly recited in claim 10, wherein the flow switch sensor PCBA is in communication with said smart water circulation pump via said external controller, such that water flow deviation data measured by the flow switch sensor is used to signal the water circulation pump to adjust a current pump motor speed to an adjusted pump motor speed, thereby adjusting a deviated current water flow rate through the chlorinator cell housing to an initial desired water flow rate.

12. A method for automatically adjusting pool water flow rate through a closed loop circulation system including a smart water pump, comprising steps of:
   (a) providing a salt water chlorine generator assembly integrated in-line with the closed loop water circulation system, the salt water chlorine generator assembly comprising:
      a chlorinator cell housing defining a chlorinator cell housing interior space in fluid communication with a chlorinator cell housing water flow inlet and an opposite chlorinator cell housing water flow outlet, the chlorinator cell housing interior space defining an electrolytic cell compartment in fluid communication with a flow switch subassembly compartment;
      an electrolytic cell of a chlorinator cell subassembly contained within said electrolytic cell compartment; and
      a flow switch subassembly contained within said flow switch subassembly compartment;
   (b) determining a water flow rate variation associated with a pool maintenance device fluidly communicating and interconnected with the salt water chlorine generator assembly, wherein the water flow rate variation relates to the rate of water flow through the chlorinator cell housing; and,
   (c) communicating a signal from the salt water chlorine generator assembly, via an external controller, to the smart water pump to adjust a pump motor speed from a current motor speed to an adjusted motor speed, wherein the adjusted motor speed causes a corresponding adjustment of the rate of water flow through the chlorinator cell housing adequate to correct the water flow rate variation associated with the pool maintenance device.

* * * * *